Aug. 26, 1969  G. W. FRANCKLYN  3,462,858

SHELLFISH HARVESTING MACHINE

Filed Aug. 12, 1968

INVENTOR
GILBERT W. FRANCKLYN
BY
Christensen, Sanborn, &
Matthews
ATTORNEYS

United States Patent Office 3,462,858
Patented Aug. 26, 1969

3,462,858
SHELLFISH HARVESTING MACHINE
Gilbert W. Francklyn, Rte. 2, Box 614,
Poulsbo, Wash. 98370
Filed Aug. 12, 1968, Ser. No. 751,828
Int. Cl. E02f 5/00, 3/88; A01d 45/08
U.S. Cl. 37—55                                                      7 Claims

ABSTRACT OF THE DISCLOSURE

The capacity of a shellfish harvesting machine is significantly increased by directing flow-assisting fluid jets rearwardly from the blade of the scoop. Many rocks and unneeded material entering the scoop fall through apertures formed in the bottom of the scoop between the rear edge of the blade and the conveyor with the lighter shellfish material carried by the fluid jets across the apertures and onto the conveyor. A deflector plate inclined between the apertures and conveyor presents another barrier for the rocks causing them to tumble forwardly through the apertures while the shellfish transit the plate and fall onto the conveyor.

BACKGROUND OF THE INVENTION

Field of the invention

This invention relates to an improvement in shellfish harvesting machinery and particularly to an apparatus for separating the shellfish from other material dug up by the machine prior to conveying the shellfish to the surface where it is collected.

Description of the prior art

Since shellfish, particularly clams, reside beneath the floor of a water body, commercial harvesters of shellfish have been developed which dredge up a layer of the sea bottom to separate the shellfish from the other dredged material. One such system currently in use is that disclosed in the United States patent to Hanks, No. 2,672,700. As disclosed therein a self-propelled boat transits the harvesting area with the shellfish harvesting mechanism suspended downwardly from the boat with one end riding along the sea floor on skids. Depending downwardly from the skids is a scoop having at its lower edge a blade for cutting in to the mud, sand, and other material in the sea floor conveying it through the scoop to a conveyor having one end positioned at the rear end of the scoop and the other end positioned at the boat. The dredging force is reduced by means of high pressure fluid jets projecting downwardly from the skids toward the scoop knife edge to break up the sea bottom material making it easier to flow through the scoop. At the top end of the conveyor, a crew is used to separate the shellfish from the rocks, mud, and other material brought up to the surface from a conveyor so that the shellfish can be harvested and the unneeded material is permitted to fall back into the water from the end of the conveyor to fill up the hole made by the scoop.

While the Hanks type of harvesting machine has been successfully used, the econoimcs of present day shellfish operations require an increased yield without a significant increase in equipment cost and labor cost. One of the disadvantages of the Hanks machine is that it would load the front blade with sand, gravel, rock, and shell material. It has been found in practice that this causes the scoop to plug up and quit functioning entirely. The net result would then be that no further material could get to the conveyor belt.

OBJECTS AND SUMMARY OF THE INVENTION

In view of the demands for increased efficiency and production for shellfish harvesting equipment, it is a principal object of the instant invention to provide a generally improved harvesting machine which increases the shellfish yield without significantly increasing the cost of the harvesting equipment.

Another object of the instant invention is to provide an improved shellfish harvesting machine which by design eliminates the need for conveying all of the material entering the scoop up to the surface and thereby reduces the wear and tear on the conveying equipment and also reduces the sorting and selection labor requirements at the surface.

Another object of the instant invention is to provide a generally improved shellfish harvesting machine which reduces the amount of shellfish breakage by reducing the number of rocks conveyed from the scoop to the surface.

A still further object of the instant invention is to provide a modification for existing shellfish harvesting equipment which can be easily fabricated to provide a significant increase in capacity of such existing equipment.

A related object of the instant invention is to provide a generally improved shellfish harvesting machine which reduces the towing effort required for harvesting the same amount of shellfish as previously harvested by prior art machines and permits deeper dredging cuts yielding shellfish too deep beneath the bottom to be harvested by prior art machines.

In accordance with the present invention the towing effort for existing shellfish harvesting equipment is significantly reduced by providing fluid jets under pressure in the body of the scoop blade with the jets directed to the rear of the scoop to assist in the acceleration of the material flowing through the scoop toward the conveyor. To provide a significant increase in the yield of existing harvesting equipment, such as the Hanks equipment previously described, the bottom wall of the scoop contains apertures in the area between the rear end of the blade and the input end of the conveyor. Rocks and other heavy clumped material which passes the blade tend by their weight to fall through the apertures while the lighter shellfish material is buoyed up by the fluid jets emanating from the blade and are thereby carried onto the conveyor. By positioning a pivotally mounted deflector plate adjacent to the infeed end of the conveyor and the bottom wall apertures, it is possible to regulate the amount of rocks which are prevented from passing over the deflector plate and onto the conveyor by increasing the angle of the deflector plate such that the rocks tumble down the plate through the apertures and out of the scoop while the lighter shellfish tend to be washed up the surface of the deflector plate and onto the conveyor through the action of the fluid jets from the blades. The sorting effort at the surface is reduced through the reduction of the amount of rocks mixed in with the shellfish. The pulling effort is reduced by the additional material propelling energy from the fluid jets in the blade as well as by the weight reduction of the material passing through the apertures in the bottom wall of the scoop.

These and other features and advantages of the invention will become more clearly apparent from the following detailed description thereof, which is to be read with reference to the accompanying drawings.

DESCRIPTION OF THE PREFERRED EMBODIMENT

For ease of understanding the structural improvements of the instant invention each will be disclosed with reference to the shellfish harvesting machine disclosed in the previously-mentioned patent to Hanks, recognizing that other harvesting machines could be modified by those skilled in the art following the principles disclosed with relation to the instant improvements.

Figure 1:
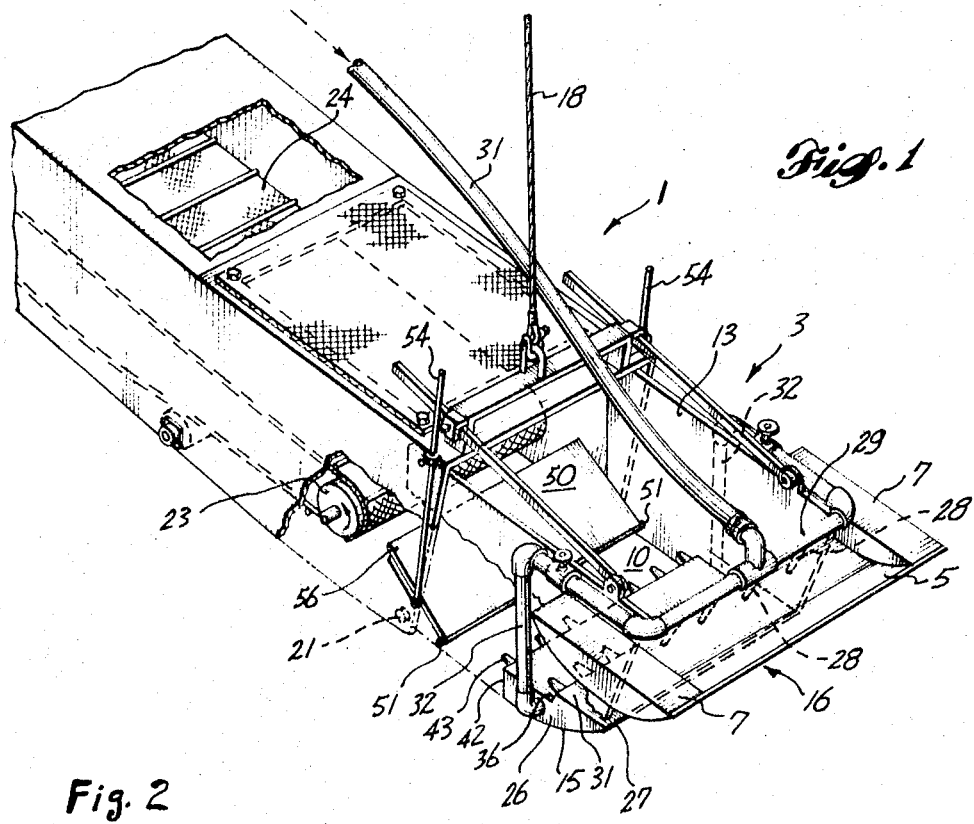
FIGURE 1 is an isometric view illustrating the lower end of an improved shellfish harvesting machine made in accordance with the instant invention.

With reference to FIGURE 1 it is noted that the harveser 1 is depended downwardly from the vessel (not shown) and includes a scoop 3 which is guided along the undisturbed bottom surface 4 by means of a skid plate 5 attached to side runners 6 and 7. Scoop 3 includes downwardly spaced side walls 10 and 11 which are joined at the top by top wall 13 and enclosed at the bottom by bottom wall 15 to define a scoop opening 16. Scoop 3 is supported from the vessel (not shown) by means of a connection between the frame bale plate 17 extending across top wall 13 and a support cable 18. The rear end of scoop 3 is connected to conveyor housing 20 extending toward the water surface through a pivot connector 21. As shown through the conveyor housing 20 the lower end of conveyor 23 includes a screen-like conveyor belt 24 which is operated so that its upper flight is moving upwardly, as shown by the arrow, for transporting the shellfish 60 from scoop 3 up to the surface vessel.

Extending from the forward edge of the scoop bottom wall 15 is the blade 26 having a leading edge 27. To the rear of skid plate 5, extending transversely across the top of scoop opening 16 are a series of skid nozzles 28 directing fluid under pressure toward the blade edge 27 and into scoop opening 16 to assist in the breaking up of the material passing through scoop opening 16. Skid nozzles 28 are provided by a fluid under pressure through a fluid manifold 29 from a supply hose 31 dependent from the towing vessel. Extending downwardly from fluid manifold 29 toward one end of blade 26 is a blade supply line 32 providing fluid under pressure to the interior of blade 26.

Figure 2:
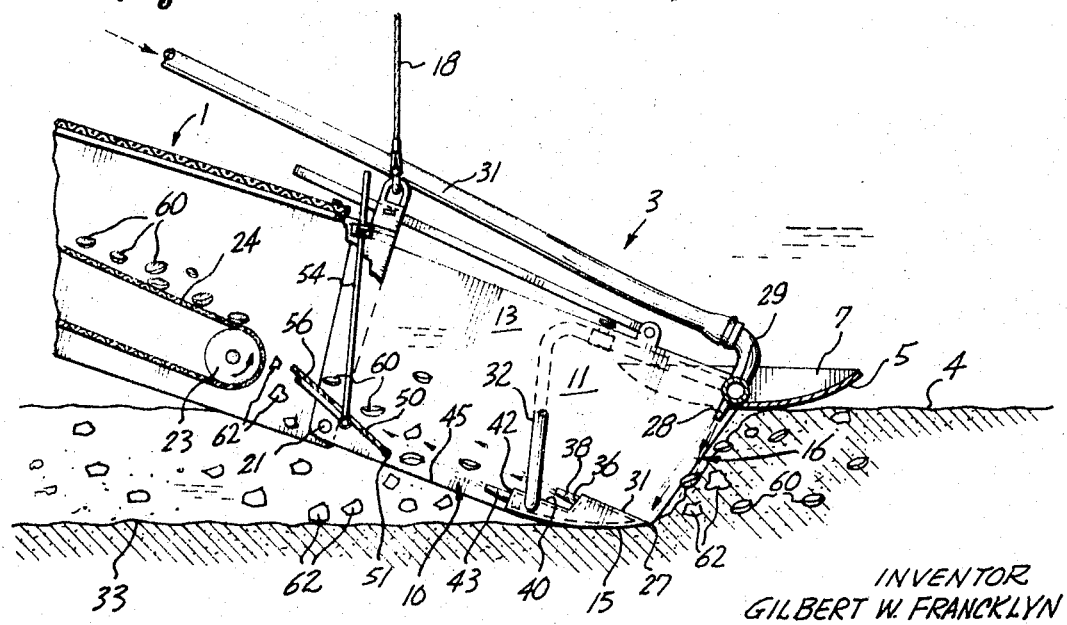
FIGURE 2 is a side section view of the shellfish harvesting machine shown in FIGURE 1, schematically illustrating the action of the blade nozzles, scoop floor apertures, and the deflector plate in operation.

As best shown in FIGURE 2, as the scoop 3 is pulled along by a cable 18 it is guided along the bottom 4 by runners 6, 7, with the blade 26 cutting into the bottom to a dredged surface 33 so that the material cut by blade 26 flows through the scoop opening 16. Blade 26 defines a first blade surface 34 extending rearwardly from leading edge 27 and having a rear edge forming a stepped edge 36 as it extends downwardly toward scoop bottom wall 15 until it joins the second blade surface 40 extending to the blade's rear edge 42. Emanating along stepped edge 36 and directed rearwardly are blade nozzles 38 and emanating from the rear edge 42 along the transverse length of the rear edge 42 are blade fluid nozzles 43 directing a flow of fluid under pressure rearwardly toward the lower end of the conveyor 23. The additional flow provided by the fluid under pressure from the blade nozzles 38 and 43 assists in the movement of the material entering scoop opening 16 thereby reducing the drag caused by the bunching of this material previously occurring within a similar scoop structure.

In order that a large portion of the rocks 62 which enter through scoop opening 16 are not carried up conveyor belt 24, bottom wall 15 of scoop 3 defines an aperture 45 extending in the scoop bottom wall portion between the rear edge 42 of blade 26 toward the lower end of the conveyor 23. Such an aperture 45 may be a large screen-like structure having openings large enough to permit the easy exit of rocks or, as shown, the aperture is provided by a major separation between the forward portion of the bottom wall 155 and the rear portion of the scoop assembly. Since rocks 62 are heavier than shellfish 60, they tend to fall through the aperture 45, whereas shellfish 60 are carried by the fluid under pressure emitting from the blade nozzles 38, 43 toward the lower end of conveyor 23.

As an additional means for controlling the amount of rocks 60 reaching conveyor belt 24, a deflector plate 50 can be placed within the rear end of scoop 3 to extend transversely across the path of the material passing across the aperture 45 to present an inclined plane extending from the lower leading edge 51 of plate 50 to its upper trailing edge 52 positioned adjacent the lower end of conveyor 23. A positioning rod 54 can be used to change the angle of deflection of deflector plate 50 as it is pivoted about pivoting support 56. Some of the rocks 60 which had sufficient velocity to pass from blade 26 will strike deflector plate 50 but, due to the incline of deflector plate 50, most of those rocks are unable to continue their path upwardly and have a tendency to tumble forward and out of scoop 3 through the aperture 45, coming again to rest upon the dredge surface 33 filling up the cut made by the scoop 3.

While the operation of the individual improvements disclosed herein has been related as these items have been described, for purposes of a summary the operation of the improved harvesting machine 1 is again related. Harvester 1 is suspended by cable 18 from a supporting towing vessel (not shown) down against bottom 4 of the water in the harvesting area. The vessel pulls the scoop 3 along bottom 4 with the skid plate 5 and side runners 6 and 7 regulating the position of scoop 3 with its dependent blade 26 cutting into the bottom material to a dredge surface 33. The material cut by the blade 26 and the leading edges of scoop side walls 10 and 11 enter through the scoop opening 16 and are propelled rearwardly through the combined effects of the motion provided by the towing vessel and the fluid under pressure emanating from skid nozzles 28 and blade nozzles 38 and 42. A separation of shellfish 60 from the heavier rocks and mud 62 is accomplished by means of bottom wall aperture 45 defined by bottom wall 15 of scoop 3 between rear edge 42 of the blade 26 and the lower end of conveyor 23. The heavier material tends to fall through the fluid jets of blade nozzles 38 and 43 but lighter shellfish material 60 is buoyed up by these fluid jets and continues in its path toward the conveyor belt 24 where it is carried up to the tending vessel. Additional control of the amount of rocks and other material is obtained by utilization of deflector plate 50 which is inclined across the path of the rocks 62 and shellfish 60 as they pass over the bottom wall aperture 45 toward the lower end of conveyor 23. The angle of the deflector plate can be increased to make it more difficult for the heavier rocks 62 to transit across deflector plate 52 from its leading edge 51 to its trailing edge 52 and onto the conveyor belt 24.

It is therefore seen that conveyor belt 24 is used primarily to carry the lighter shellfish material 60 rather than a combination of mud, shellfish and rocks. This also means that the propelling assistance provided by blade jets 38 and 43 reduces the drag of the scoop 3 and thereby reduces the pulling force required on the cable 18 depending from the towing vessel. In addition, it is noted that a good portion of the material entering the scoop opening 16 exits from scoop 3 through bottom wall aperture 45 therefore permitting a greater amount of material to enter scoop opening 16 while having a reduction in the amount of material conveyed by conveyor belt 24. The reduction of the amount of rocks and other undesired material mixed in with the desired shellfish results in a higher yield at the vessel with less sorting effort. It has been found in actual operation that utilizing the improvements herein noted as modifications to the Hanks type of harvester, it has been possible to increase the shellfish yield from four to five times that previously obtained. In addition, it has been found that the assistance provided by the blade nozzles in reducing the drag on the towing vessel permits a deeper cut by the scoop 3 thereby harvesting shellfish which reside deeper in the bottom of the water than could be obtained utilizing the prior known harvesting equipment with a vessel having the same towing power.

What is claimed is:

1. In a sellfish harvesting apparatus having a scoop to travel along the floor of a water body, a conveyor means extending upwardly from the rear end of said scoop and blade means supported at the front open end of said scoop, the improvement comprising:

said blade including a forward cutting edge for cutting into said water body floor, an upper surface for supporting material entering said scoop and a remote edge portion depending downwardly from said upper surface rearwardly from said cutting edge;

blade nozzle means positioned along said blade remote edge for projecting fluid under pressure from below said blade upper surface toward said conveyor; and means for supplying fluid under pressure to said blade nozzle means.

2. The apparatus of claim 1 wherein:

the bottom wall of said scoop extending from the remote edge portion of said blade to the lower end of said conveyor defining aperture means permitting a portion of the material entering said scoop to pass over said blade and exit from said scoop through said aperture means without being supported by said conveyor.

3. The apparatus of claim 2 including:

deflector plate means positioned within said scoop means intermediate said blade and conveyor and having a leading edge positioned to the rear of a portion of said aperture means and a trailing edge inclined upwardly from said leading edge to a position adjacent said lower end of said conveyor for deflecting a portion of the material transitting said aperture means toward said conveyor.

4. The apparatus of claim 3 wherein:

at least a portion of said blade nozzle means is positioned for directing fluid against said deflector plate means.

5. The apparatus of claim 3 wherein:

said deflector plate means is pivotally mounted on an axis transverse to the flow of said material through said scoop for changing the angle of inclination of said deflector plate means to change the amount of heavier material that can transit across said plate without tumbling forward out of said scoop through said aperture means.

6. The apparatus of claim 1 wherein:

said blade means includes stepped supporting surfaces with a plurality of nozzle means projecting out of the edge portion of said blade separating adjacent stepped surfaces.

7. The apparatus of claim 1 wherein:

a plurality of said blade nozzle means project from the rear edge of said blade.

References Cited

UNITED STATES PATENTS

| | | | |
|---|---|---|---|
| 1,180,664 | 4/1916 | Littlehales | 37—62 |
| 1,507,864 | 9/1924 | Smith | 302—14 XR |
| 2,144,743 | 1/1939 | Schulz. | |
| 2,288,701 | 7/1942 | Heden | 37—55 |
| 2,672,700 | 3/1954 | Hanks | 37—55 |

ROBERT E. PULFREY, Primary Examiner

CLIFFORD D. CROWDER, Assistant Examiner

U.S. Cl. X.R.

37—63; 56—9; 299—8